United States Patent [19]

Castagno

[11] Patent Number: 4,678,227
[45] Date of Patent: Jul. 7, 1987

[54] WEATHER STRIP FOR A MOTOR-VEHICLE
[75] Inventor: Aldo Castagno, Turin, Italy
[73] Assignee: Fiat Auto S.p.A., Turin, Italy
[21] Appl. No.: 906,687
[22] Filed: Sep. 11, 1986

Related U.S. Application Data

[62] Division of Ser. No. 761,722, Aug. 2, 1985, abandoned.

[30] Foreign Application Priority Data

Aug. 2, 1984 [IT] Italy ................................ 67768 A/84

[51] Int. Cl.$^4$ ............................................. B60J 5/04
[52] U.S. Cl. ....................................... 296/213; 49/490; 49/495
[58] Field of Search ....................... 296/146, 213, 93; 49/490, 491, 496, 495; 428/122, 358

[56] References Cited

U.S. PATENT DOCUMENTS

| | | | |
|---|---|---|---|
| 4,263,750 | 4/1981 | Hein | 49/490 |
| 4,378,130 | 3/1983 | Shimizu | 296/146 X |
| 4,432,166 | 2/1984 | Weimar | 49/491 |
| 4,444,428 | 4/1984 | Iwakura et al. | 296/213 X |
| 4,448,430 | 5/1984 | Bright | 49/491 X |
| 4,492,405 | 1/1985 | Chikaraishi et al. | 296/146 |
| 4,496,186 | 1/1985 | Tuchiya et al. | 296/93 X |
| 4,513,044 | 4/1985 | Shigeki et al. | 49/490 X |
| 4,549,761 | 10/1985 | Lee et al. | 49/490 X |

FOREIGN PATENT DOCUMENTS 190043  10/1984  Japan ................................ 296/213

Primary Examiner—Philip C. Kannan
Attorney, Agent, or Firm—Sughrue, Mion, Zinn, Macpeak & Seas

[57] ABSTRACT

The invention relates to a weather strip for wrap-over doors which is constituted by a semi-rigid plastic or rubber part adapted to fit on to the sheet metal edge of the body and a second solid, sponge-rubber part glued to the first part and adapted to provide a seal for the door and a filler between it and the body.

2 Claims, 2 Drawing Figures

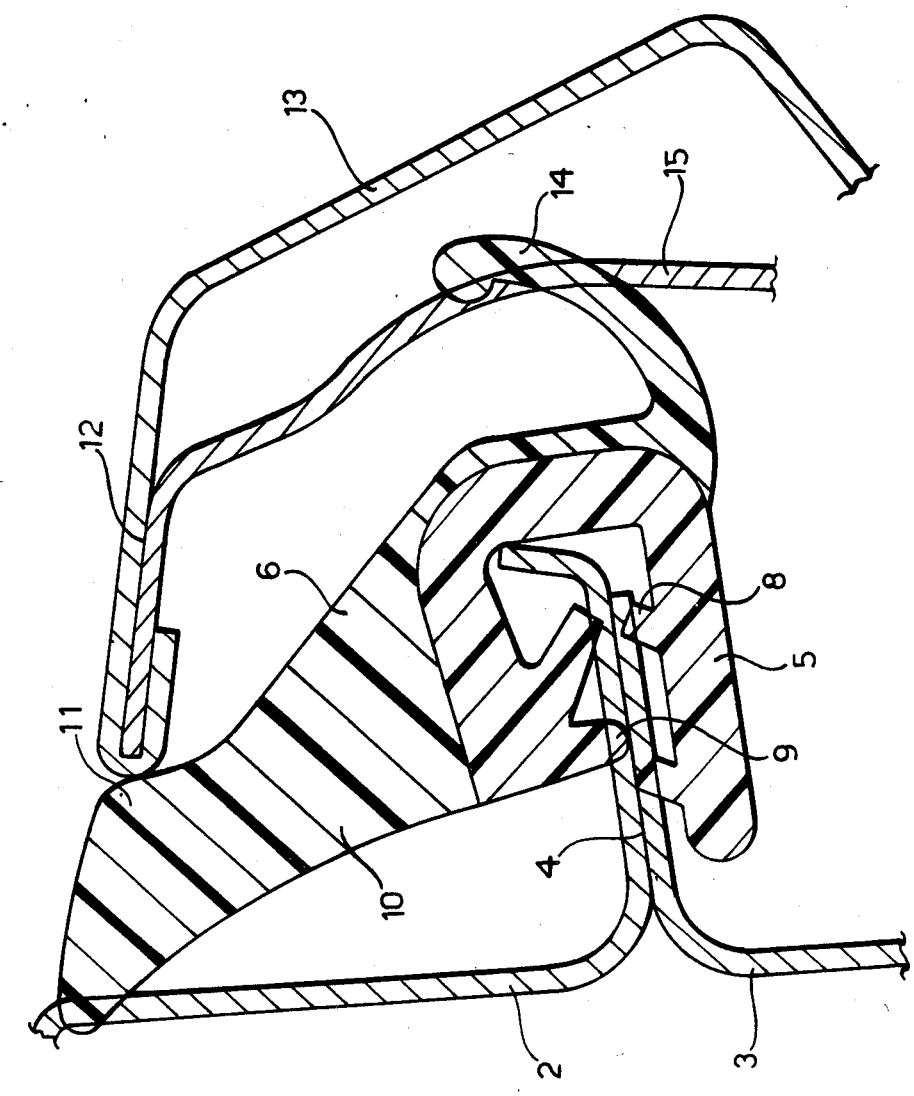

WEATHER STRIP FOR A MOTOR-VEHICLE

This is a division of application Ser. No. 761,722, filed Aug. 2, 1985 now abandoned.

DESCRIPTION

The present invention relates to a weather strip for motor-vehicle wrap-over doors constituted by two parts, one of semi-rigid plastics or rubber and the other of soft rubber.

At present, in order to improve the aerodynamic characteristics of motor vehicles, the door profile is designed so that the upper part is of the wrap-over type and covers the channel for draining water from the roof.

This, in fact, when it was uncovered, increased the coefficient of resistance to air penetration appreciably.

Weather strips used at present to make this type of door impermeable are constituted by a part of semi-rigid plastics or elastomeric material, possibly with a metal core, glued to a tubular rubber part with a profile shaped according to requirements.

One of the disadvantages of this type of weather strip lies in the fact that is is very difficult to maintain its initial shape when it is bent to adapt it to the profile of a door.

In fact, where it is curved, the shape becomes different, and this may result in disadvantages of a functional type, such as whistling and rustling noises and water seepage in more serious cases, or of an aesthetic type, in the sense that the rubber does not remain in line with the body and may have hollows or projections.

A second advantage lies in the fact that vibrations produced by the vehicle in movement can cause the rubber part to rub continuously against the door profile so that, in the long run, it removes paint from the sheet-metal parts leaving them free from protection and readily attacked by rust.

Another disadvantage results from the fact that a weather strip of the said type presents not inconsiderable difficulties of registration.

The object of the present invention is to avoid these and other disadvantages.

This object is achieved by means of a weather strip for motor-vehicle wrap-over doors constituted by two distinct parts of which the first is a channel section of semi-rigid rubber or plastics material fitted to the edge of the sheet metal defining the door opening and the second is of rubber, of roughly trapezoidal shape and is glued to the first part and has a portion extending into a lip projecting laterally-outwardly of the door opening, the trapezoidal part projecting upwardly thereof, characterised in that the second part is made from soft, solid rubber and the side of the trapezium facing outwardly of the door opening has a protuberance which is abutted by the upper edge of the door.

Further characteristics and advantages will become clear from the following description with reference to the appended drawings, provided purely by way of non-limiting example, in which:

FIG. 2 is a sectional view of the weather strip of the invention taken on the line II—II of FIG. 1.

Figure 1:
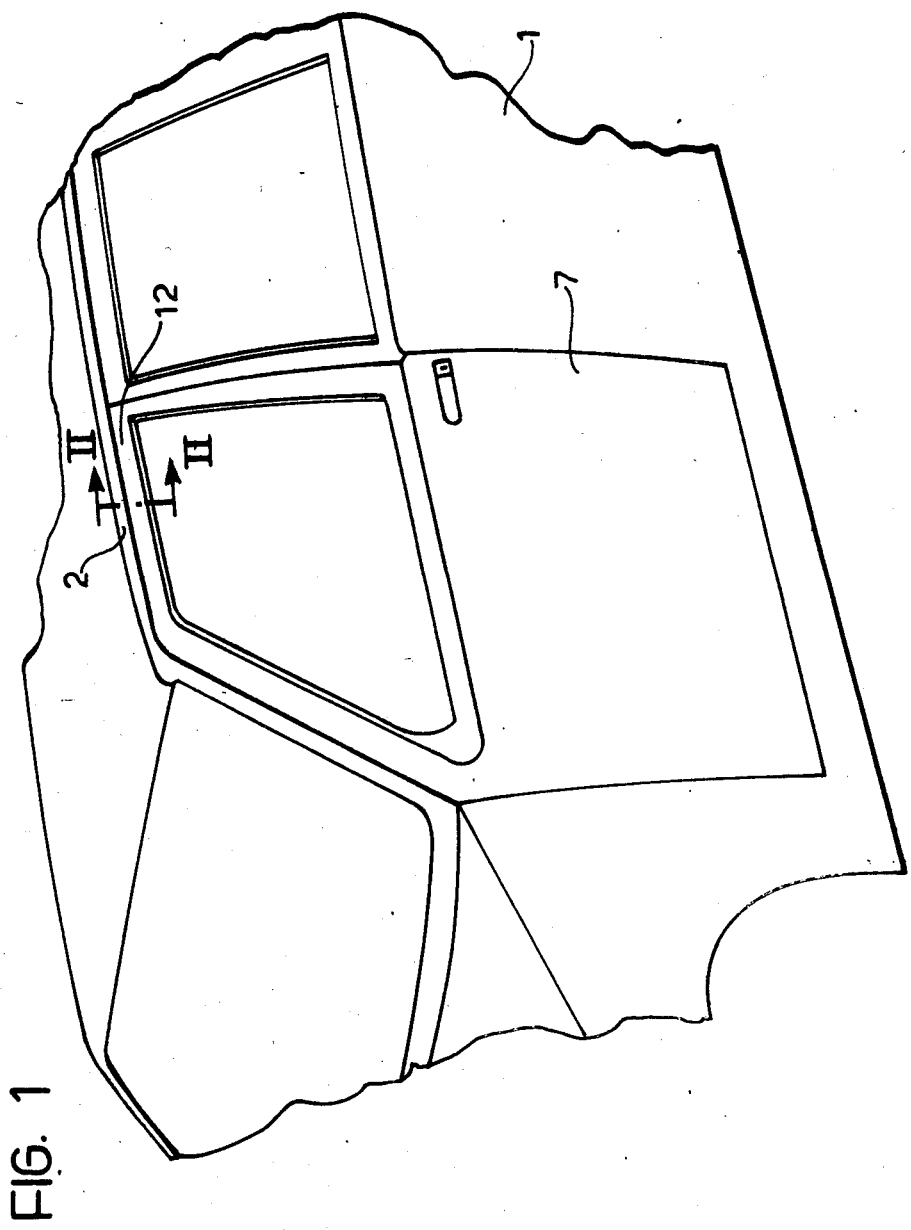
FIG. 1 is a schematic view of a side of a motor vehicle provided with a weather strip of the invention.

With reference to the drawings, reference 1 indicates the side of a motor vehicle the roof 2 whereof, which is welded to the intermediate part 3 forms a projecting edge 4 which acts as a water-drainage channel.

The first part 5 of a semi-rigid plastics or rubber weather strip 6 for a wrap-over door 7 is fitted on the edge 4.

The said first part has a channel section and has internal fish-bone like projections 8 which help to retain it on the edge 4; the upper inner wall of the part 5 also has a rounded projection 9 which, in contacting the metal sheet, defines the water-drainage channel between the part of the metal sheet forming the roof 2 and the weather strip itself.

To the first plastics part 5 is glued a second part 10 of the weather strip 6 which is of solid, soft rubber, of a roughly trapezoidal shape, projecting upwardly of the door opening when the weather strip is in position.

On that side of the trapezium facing outwardly of the door space, the weather strip is formed with a rounded protuberance 11 which makes the upper profile of the weather strip almost flat for aesthetic and aerodynamic purposes and forms an abutment for the upper edge 12 of the box-section door 13 so that the latter is not in sliding contact therewith but acts to compress it, the space being completely sealed and connected to the adjacent metal sheets.

The solid, soft-rubber part of the weather strip 10 extends over the outer side of the first part and is formed into a lip 14 which projects laterally of the door opening to seal against the metal sheet 15 of the door box-section when this is closed, so as to form a further barrier to air and other external agents.

The whole, as will be easily understood, constitutes a perfect connector between the profiles of the door and the roof of the body, completely sealing the space between the metal sheets.

What is claimed is:

1. A motor vehicle having a body portion with at least one door opening in each side thereof, a roof having a top portion, a downwardly extending side portion on each side thereof and an outwardly extending flange along each side portion which defines a drip channel above each door opening, a door hinged to said body in each opening with an inwardly extending upper edge portion overlying said flange in the closed position of the door in substantially flush relation with said top portion and a sealing member for the top edge of each door comprising a first channel-shaped portion of semi-rigid material having an upper surface, an end surface and a lower surface mounted on said outwardly extending flange and a second soft, solid rubber portion secured to said upper and end surfaces of said first portion and having a first projection with an upwardly tapered substantially trapezoidal cross section extending upwardly and inwardly from said upper surface of said channel-shaped portion wherein the uppermost end portion of said first projection is formed with a protuberance adapted to be engaged between the top edge of said door and said side portion of said roof adjacent said top portion to provide an upper surface which is substantially flush with said top portion of said roof and said upper edge portion of said door and having a second projection extending laterally outwardly and upwardly from said end surface of said channel-shaped portion for engagement by the inner surface of said door in the closed position.

2. A motor vehicle as set forth in claim 1 wherein the end of said channel-shaped portion having said upper surface thereon terminates in a rounded projection engaging the upper surface of said flange to define the water drainage channel between a side portion of said roof and said sealing member.

* * * * *